US007400577B2

(12) United States Patent
Padmanabhan et al.

(10) Patent No.: US 7,400,577 B2
(45) Date of Patent: Jul. 15, 2008

(54) METHODS AND SYSTEMS FOR STREAMING DATA

(75) Inventors: Venkata N. Padmanabhan, Bellevue, WA (US); Jiahe Wang, Issaquah, WA (US); Philip A. Chou, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 834 days.

(21) Appl. No.: 10/787,612

(22) Filed: Feb. 25, 2004

(65) Prior Publication Data

US 2005/0185578 A1    Aug. 25, 2005

(51) Int. Cl.
*G01R 31/08* (2006.01)
(52) U.S. Cl. ...................... 370/229; 709/235
(58) Field of Classification Search ................ 370/229, 370/231–236; 714/748, 752; 709/226, 235
See application file for complete search history.

(56) References Cited

U.S. PATENT DOCUMENTS

| | | | | |
|---|---|---|---|---|
| 6,151,633 | A * | 11/2000 | Hurst et al. | 709/235 |
| 6,185,698 | B1 * | 2/2001 | Wesley et al. | 714/18 |
| 6,215,766 | B1 * | 4/2001 | Ammar et al. | 370/229 |
| 6,987,728 | B2 * | 1/2006 | Deshpande | 370/229 |
| 7,035,217 | B1 * | 4/2006 | Vicisano et al. | 370/236 |

OTHER PUBLICATIONS

The Active Traffic Control Mechanism for Layered Multimedia Multicast in Active Network, Saehoon Kang et al., Modeling, Analysis and Simulation of Computer and Telecommunication Systems, 2000, Proceedings, 8th International Symposium, pp. 325-332, IEEE, Year 2000.*

Barabasi, Albert-Laszlo, et al., "Emergence of Scaling in Random Networks," *Science*, vol. 286, (1999), pp. 509-512.

Bu, Tian, et al., "Network Tomography on General Topologies," *Proc. ACM Sigmetrics*, (2002).

Castro, Miguel, et al., "SplitStream: High-bandwidth Content Distribution in Cooperative Environments," *Proc. SOSP*, (2003).

Chawathe, Yatin, et al., "Making Gnutella-like P2P Systems Scalable," *Proc. ACM Sigcomm*, (2003).

(Continued)

*Primary Examiner*—Chirag G Shah
*Assistant Examiner*—Yong Zhou
(74) *Attorney, Agent, or Firm*—Wolf, Greenfield & Sacks, P.C.

(57) ABSTRACT

A technique is disclosed that can efficiently control congestion, while supporting heterogeneity for streaming data among multiple computers in a network. A plurality of nodes is divided into a plurality of distribution trees within a computer network, wherein the data is divided into a plurality of prioritized layers. When a node experiences packet loss, the location of the congestion is inferred. If the congestion is at or near the outgoing link, outgoing traffic is shed to alleviate the congestion by shedding child node(s) receiving descriptions in the least important layer of data that the child node(s) are receiving. Similarly, if the congestion is at or near the incoming link, incoming traffic is shed by shedding parent nodes that are sending descriptions in the least important layer of data that the node is receiving. Nodes with available bandwidth are further instructed to subscribe to additional descriptions.

30 Claims, 6 Drawing Sheets

OTHER PUBLICATIONS

Chou, Philip A., et al., "Layered Multiple Description Coding," *Proc. Packet Video Workshop*, (2003).

Chu, Yang-Hua, et al., "Enabling Conferencing Applications on the Internet Using an Overlay Multicast Architecture," *Proc. ACM Sigcomm*, (2001).

"End System Multicast," http://esm.cs.cmu.edu, printed on May 6, 2004.

Goyal, Vivek K., "Multiple Description Coding: Compression Meets the Network," *IEEE Signal Processing*, (2001), pp. 74-93.

Liu, Jiangchuan, et al., "A Hybrid Adaptation Protocol for TCP-Friendly Layered Multicast and Its Optimal Rate Allocation," *IEEE Infocom*, (2002).

McCanne, S.R., et al., "Receiver-driven Layered Multicast," *Proc. ACM Sigcomm*, (1996).

Medina, Alberto, et al., "Brite: An Approach to Universal Topology Generation," *Proc. Mascots*, (2001).

Padmanabhan, Venkat, et al., "Resilient Peer-to-Peer Streaming," *Proc. IEEE ICNP*, (2003).

Padmanabhan, Venkat, et al., "Distributing Streaming Media Content Using Cooperative Networking," *Proc. NOSSDAV*, (2002).

http://www.rawflow.com/technology.html, printed on May 4, 2004.

Wu, Linda, et al., "Thin Streams: An Architecture for Multicasting Layered Video," *Proc. NOSSDAV*, (1997).

Albanese et al., "Priority Encoding Transmission," *IEEE Transactions on Information Theory*, vol. 42, pp. 1737-1744 (Nov. 1996), Chou et al., "Clustering Source/Channel Rate Allocations for Receiver-driven Multicast under a Limited Number of Streams," *2000 IEEE International Conference on Multimedia and Expo (ICME 2000)*, pp. 1221-1224 (Jul. 2000).

Chou et al., "Error Control for Receiver-Driven Layered Multicast of Audio and Video," *IEEE Transactions on Multimedia*, vol. 3, No. 1, pp. 108-122 (Mar. 2001).

Davis et al., "Joint Source and Channel Coding for Image Transmission Over Lossy Packet Networks," *SPIE*, vol. 2847, pp. 376-387 (Aug. 1996).

Majumdar et al., "Rate-Distortion Efficient Video Transmission from Multiple Servers," *International Conference on Multimedia and Expo (ICME)*, Lausanne, Switzerland (Aug. 2002).

Mohr et al., "Approximately Optimal Assignment for Unequal Loss Protection," *Proceedings of the IEEE International Conference on Image Processing (ICIP 2000)*, vol. 1, pp. 367-370. (Sep. 2000).

Mohr et al., "Unequal Loss Protection: Graceful Degradation of Image Quality over Packet Erasure Channels Through Forward Error Correction," *IEEE Journal on Selected Areas in Communications*, vol. 18, No. 6, pp. 819-829 (Jun. 2000).

Nguyen et al., "Distributed Video Streaming with Forward Error Correction," *Packet Video Workshop*, Pittsburgh, PA (2002).

Padmanabhan et al., "Supporting Heterogeneity and Congestion Control in Peer-to-Peer Multicast Streaming," *The 3rd International Workshop on Peer-to-Peer Systems (IPTPS 2004 )*, San Diego, CA, Feb. 26-27, 2004 (2004).

Puri et al., "Multiple Description Source Coding using Forward Error Correction Codes," *The Thirty-Third Asilomar Conference on Signals, Systems, & Computers*, pp. 342-346 (Oct. 1999).

Stanković et al., "Packet Loss Protection of Embedded Data with Fast Local Search," *ICIP: 2002 Proceedings of International Conference on Image Processing*, vol. II, pp. 165-168 (Sep. 2002).

Wicker, *Error Control Systems for Digital Communication and Storage* (Prentice Hall, Upper Saddle River, NJ, 1995).

Zimmerman, "OSI Reference Model—The ISO Model of Architecture for Open Systems Interconnection," *IEEE Transactions on Communications*, vol. com-28, No. 4, pp. 425-432 (Apr. 1980).

* cited by examiner

METHODS AND SYSTEMS FOR STREAMING DATA

FIELD OF THE INVENTION

This invention relates generally to the transmission of data over a computer network, and more particularly to a way to stream data among multiple computers divided into a plurality of distribution trees having nodes within a network.

BACKGROUND

There has been a growing interest in peer-to-peer, or end host-based, multicast for streaming data. Streaming refers to network communications that allow users to utilize the data in real time as it is being downloaded as opposed to storing the data in a local memory first before the user can utilize the data. Streaming is especially prevalent with the use of audio and video files, which generally tend to be large in number of bytes. With streaming, the file is broken down into multiple frames or substreams, and the file is played in real time as the substreams are downloaded onto the user's computer. As a result, streaming avoids the delay entailed in downloading an entire file before the user can use the file.

A peer-to-peer network is a popular environment for streaming data. A peer-to-peer network is one in which peer machines are networked together and maintain the state of the network via records on the participant machines. In peer-to-peer networks, any end host can initiate communications. Peer-to-peer networks are also sometimes referred to as "end-host" networks. Typical peer-to-peer networks lack a central server for administration, although hybrid networks do exist. Thus, generally speaking, the term peer-to-peer refers to a set of technologies that allows a group of computers to directly exchange data and/or services. The distinction between peer-to-peer networks and other network technologies is more about how the member computers communicate with one another than about the network structure itself. For example, end hosts in a peer-to-peer network act as both clients and servers in that the both consumer data and serve data to their peers.

A key challenge in a peer-to-peer network is robustness. Unlike routers in Internet Protocol ("IP") multicast or dedicated servers, peers or end hosts are inherently unreliable due to crashes, disconnections, or shifts in user focus. A common way to achieve robustness is through redundancy, both in network paths and in data.

A second key challenge in a peer-to-peer network is accommodating bandwidth heterogeneity. Heterogeneity in bandwidth can be both static (e.g., due to differences in link speed) and dynamic (e.g., due to congestion). A popular approach to supporting bandwidth heterogeneity is to offer multiple streams, each optimized for a specific bandwidth level. Clients then tune in to the stream that best matches their bandwidth. The problem with this approach is that it tends to waste bandwidth on links shared by streams of different rates. Moreover, it is disruptive when clients must switch between streams of different bandwidth when responding to congestion.

Another approach to address bandwidth heterogeneity is Receiver-driven Layered Multicast ("RLM"). RLM approaches the heterogeneity and congestion control problems by combining a layered source coding algorithm with a layered transmission system that uses a separate IP multicast group for transmitting each layer of the stream. The receivers of RLM would drop layers upon congestion and add layers to probe for additional bandwidth. However, a significant drawback of RLM is that there is a fundamental mismatch between the ordering of layers based on the importance of, and the lack of widespread support for differentiated treatment of, packets in the Internet. Moreover, RLM cannot be readily applied to a peer-to-peer multicast because of several differences as compared to IP multicast (e.g., interior nodes being a dynamic set of end hosts rather than a set of dedicated routers). Thus, there is a need for an improved method and system for streaming data between multiple computers over a network.

BRIEF SUMMARY OF THE INVENTION

The invention pertains to a way to control congestion and stream data among multiple computers over a network, more specifically, among a plurality of nodes divided into a plurality of distribution trees within a computer network, wherein the data is prioritized into a plurality of layers from a most important layer to a least important layer.

In embodiments of the present invention, a method and system to control congestion is shown. In particular, in one embodiment, when congestion is detected on the input side, the node infers the location of the congestion. Specifically, the node determines whether the congestion is near the incoming link of the node, and sheds the parent nodes that are sending descriptions in a layer of data that is the least important of the layers that the node is currently receiving when the congestion is near the incoming link of the node. In another embodiment, when congestion is detected on output side, the node sheds the child nodes that are receiving descriptions in a layer of data that is the least important of the layers that the node is currently sending when the congestion is near the node's outgoing link. Still in another embodiment, when the nodes have available bandwidth, they are adapted to subscribe to an additional description in the least important layer of the layers that they are receiving or, if they are already receiving all of the descriptions of that layer, to subscribe to a description in a subsequent layer of less importance than the least important layer that they are currently receiving. Through these various embodiments, a joint design of support for heterogeneity and robustness is provided, and a hybrid parent-and-child-driven adaptation is provided, which allows the parent and child nodes to cooperatively determine the appropriate response to packet loss by exploiting path diversity to localize the cause of the packet loss. As a result, both parent and child nodes are able to exploit their knowledge of the relative importance of the layered substreams and the structure of the distribution trees to adapt to changing bandwidth in a way that minimizes the impact on the descendant nodes.

Additional features and advantages of the invention will-be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

The present description discloses a technique for controlling congestion and streaming data among a plurality of nodes divided into a plurality of distribution trees within a computer network, wherein the data is prioritized into a plurality of layers from a most important layer to a least important layer. In particular, when a node experiences packet loss, the location of the congestion is inferred (whether the congestion is near the node's incoming link or outgoing link). If the congestion is at or near the outgoing link of a congested node (e.g., the node is congested as a parent node), outgoing traffic is shed to alleviate the congestion by shedding child node(s) receiving a description in a least important layer of data among the layers that the node is sending. Similarly, if the congestion is at or near the incoming link of the congested node (e.g., the node is congested as a child node), incoming traffic is shed by shedding parent nodes that are sending a least important layer of data among the layers that the node is receiving. In another embodiment, nodes with available bandwidth are instructed to subscribe to an additional next least important layer.

The invention thus operates in a computing environment. In an embodiment of the invention, the described process operates on a collection of one or more computing devices. A suitable computing device usable in implementing all or some aspects of the invention will be first described with reference to FIG. 1, after which a network environment according to particular embodiments of the invention will be more fully described.

Although there are many computing devices suitable for implementing the invention, several exemplary types of computing devices are discussed below with respect to FIG. 1. It will be appreciated that this explanation is given for ease of understanding and is not intended to limit the scope of the invention.

Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

Figure 1:
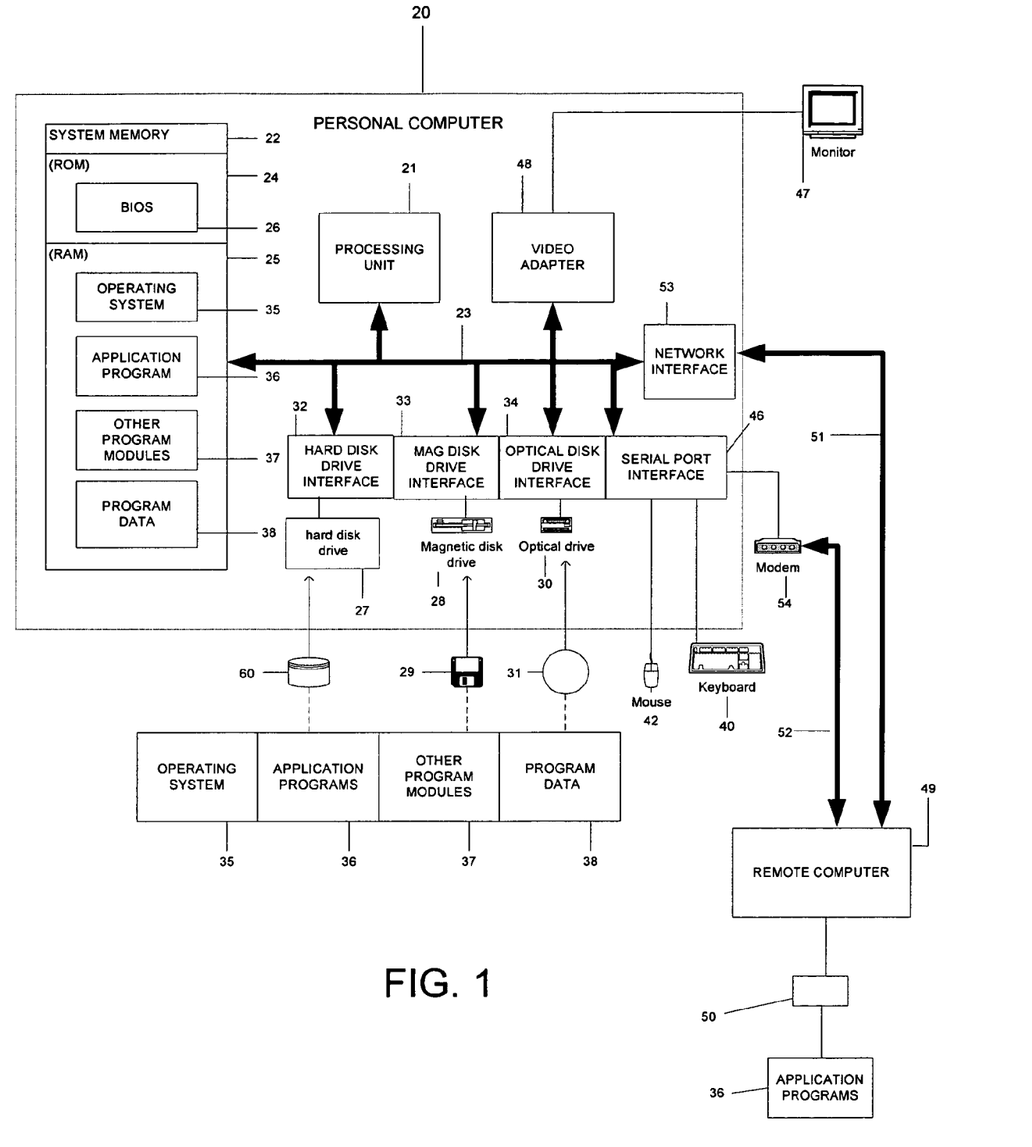
FIG. 1 is a block diagram generally illustrating an example of a device architecture in which all or a part of embodiments of the present invention may be implemented.

Turning now to FIG. 1, a general purpose computing device is shown in the form of a conventional computer 20, including a processing unit 21, a system memory 22, and a system bus 23 that couples various system components including the system memory to the processing unit 21. The system bus 23 comprises one or more physical busses of any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment. A number of program modules may be stored on the hard disk 60, magnetic disk 29, optical disk 31, ROM 24 or RAM 25, including an operating system 35, one or more applications programs 36, other program modules 37, and program data 38.

A user may enter commands and information into the computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, computers may include other peripheral output devices, not shown, such as speakers and printers.

The computer 20 operates or is operable in a networked environment using logical connections to one or more remote computers, such as a remote computer 49. The remote computer 49 may be a domain controller, a server, a router, a network PC, a personal computer, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the WAN 52. The modem 54, which may be internal or external, is connected to the system bus 23 via the serial port interface 46. Program modules depicted relative to the computer 20, or portions thereof, may be stored in the remote memory storage device if such is present. It will be appreciated that the network connections shown are exemplary and other means of establishing a communications link between the computers may be used.

Herein, the invention will generally be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware. In the following discussion, computing devices such as clients, domain controllers, servers, and so on may be of the architecture as described above with respect to FIG. 1 regarding computer 20 and/or remote computer 49, or may alternatively have any other type of architecture. The computer operations described herein are executed pursuant to the reading of computer-executable instructions from a computer-readable medium by a computer or computing device. Computer-readable media include optical, magnetic, electrical and other types of media, as well as storage media, transmission media, and so on.

Figure 2:
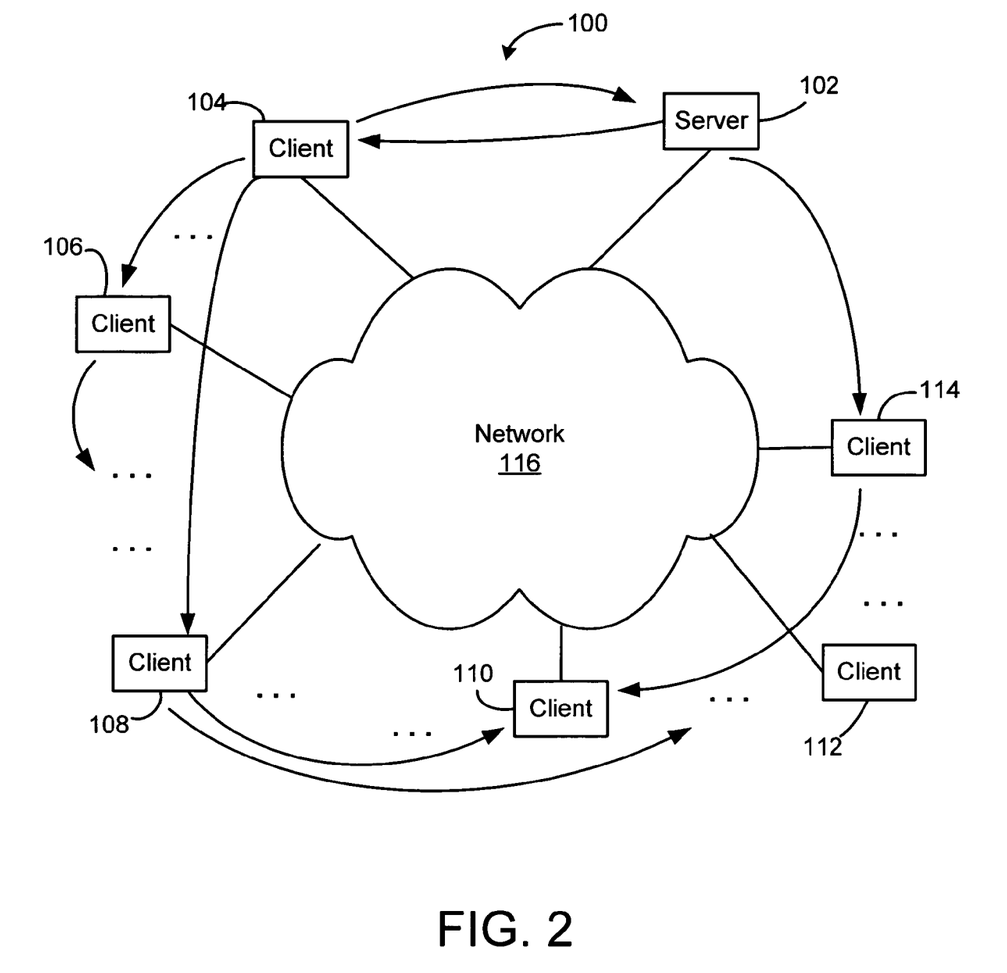
FIG. 2 is a schematic diagram showing an exemplary computer network over which a server distributes streaming data to a plurality of clients.

Referring now to FIG. 2, the present invention can be implemented in multiple types of network environments 100, such as for example, a peer-to-peer, ad hoc, end-host, overlay, or infrastructure based networks. A server 102 connects multiple clients or peers 104, 106, 108, 110, 112, and 114 for communications between the clients or peers via a computer network 116, such as the Internet. A client 104 may make a request to the server 102 for stream data that may also be available on multiple clients. The server 102, in response, provides the stream data by having other clients with the requested data collaborate in a form of cooperative networking to forward the data to the requesting client. Specifically, in order to reserve resources of the server 102, another client 106 that is already receiving the data stream is enlisted to serve the data stream to the requesting client 104, decreasing the burden on the server 102. Because the bandwidth of client 106, and not the server 102, is being utilized, the requesting client 104 is receiving the requested data, while using minimum resources of the server. However, since clients tend to disconnect from the network frequently, a redundancy is implemented to avoid data loss during streaming.

In particular, rather than using a single distribution tree as in traditional multicast, multiple diverse distribution trees spanning the interested clients are carefully constructed to ensure redundancy of the stream data. The data are divided into descriptions or substreams using multiple description coding ("MDC"), which is disclosed in an article entitled, "Layered Multiple Description Coding," Chou, P. A., Wang, H. J., and Padmanabhan, V. N., Proc. Packet Video Workshop, April 2003, which is herein incorporated by reference in its entirety for all that it teaches without exclusion. The MDC descriptions are independent of each other in such a manner that any subset of the descriptions can be decoded to obtain a stream with a quality commensurate with the number of descriptions in the subset.

Figure 3:
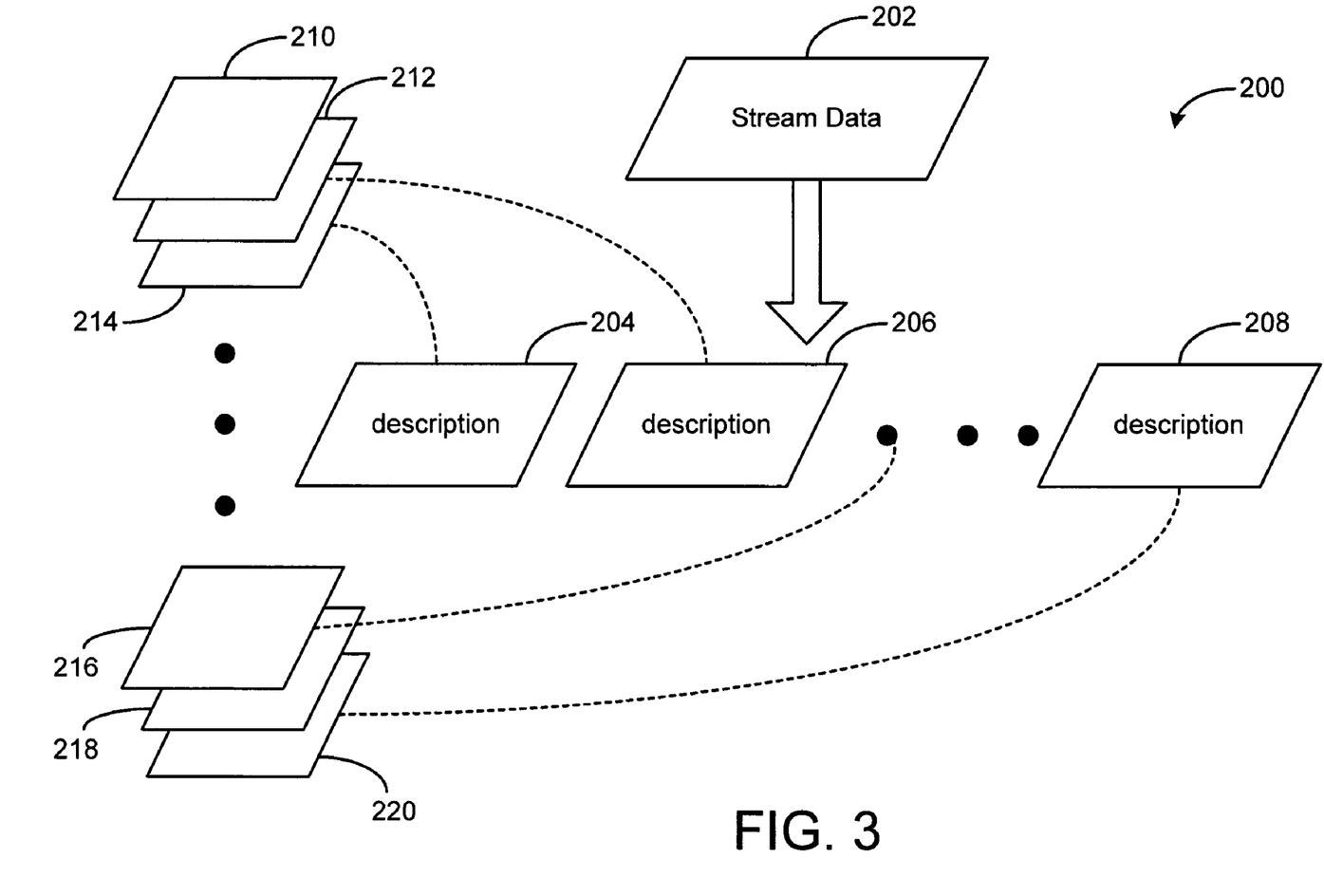
FIG. 3 is a schematic diagram in which the layered MDC data structure is shown, which is usable to implement an embodiment of the invention.
Figure 4:
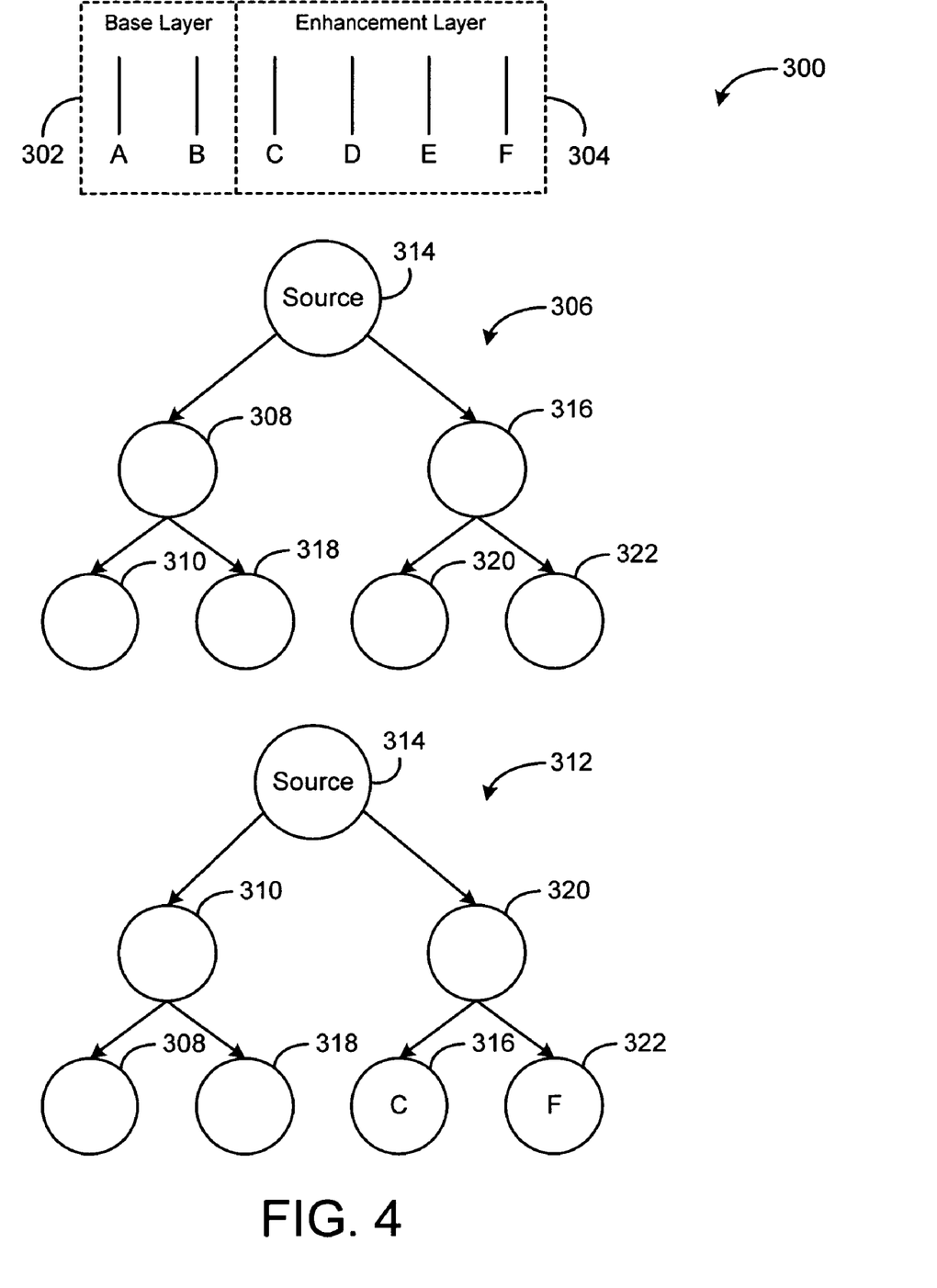
FIG. 4 is a schematic diagram showing sample distributed trees to create redundancy, which is usable to implement an embodiment of the invention.

In one embodiment of the invention, the MDC descriptions are partitioned into priority layers, which are shown in FIG. 3. The descriptions belonging to the multiple layers are then striped across the diverse set of trees, and two of such trees are shown in FIG. 4 as an example. Turning now to FIG. 3, a diagram of the layered MDC data structure is shown and indicated generally at 200. As shown, the stream data 202 is encoded, using MDC, into multiple descriptions or substreams 204, 206, and 208.

Under the layered MDC construction, however, a distinction between descriptions belonging to various layers can be created. For example, FIG. 3 illustrates that the stream data 202 can be organized into multiple ordered layers 210, 212, 214, 216, 218 and 220. The descriptions belonging to a base layer can be considered the most important descriptions and can be created by an optimization procedure that is targeted at low-bandwidth clients. In such a manner even clients with low bandwidth can have reasonable success at receiving the base layer. Similarly, the descriptions belonging to other layers, such as enhancement layers, can be considered less important and can be created by an optimization procedure that is targeted at high-bandwidth clients. Because clients with greater bandwidth are more likely to request such enhancement layers, the optimization procedure can provide for a more efficient delivery of the enhancement layers to those high-bandwidth clients.

The descriptions in the layers are then distributed across the network using a diverse set of trees. It should be noted that the order and the number of layers can be implemented in multiple ways, and thus the present invention contemplates various implementations of the use and the structure of these layers, which are within the scope of the present invention. However, as an example, FIG. 4 shows multiple layers and the descriptions in those layers prioritized in such a manner that descriptions A and B belong to a base layer 302 and can, therefore, be considered more important than the descriptions C, D, E, and F belonging to an enhancement layer 304.

To ensure redundancy with respect to both network paths and data, multiple diverse distribution trees are constructed for the descriptions. As a result, the trees are diverse in their structures. A client or peer can be a node in multiple trees, as either or both of a sender or a recipient of the descriptions. For instance, in one tree 306, node 308 can be a parent of node 310, yet node 308 can be a child of node 310 in another tree 312. In the context of the trees, a node is referred to as a client or peer transmitting a description.

A tree always has a root node, and in FIG. 4, the root node is the source 314 of the data. A root node is also a parent node, which is a node that points to and sends data to other node(s). In tree 306, the source 314 is a parent of nodes 308 and 310 (e.g., child nodes of the source), and node 308 is a parent of nodes 310 and 316. Thus, a child node is a node that is directly receiving data from the parent node in the tree, and both the parent node and the child node are linked to each other. A descendant node of a parent node, however, is any node that directly or indirectly receives data from the parent node. For example, nodes 308, 310, 316, 318, 320, and 322 are all descendant nodes of the source 314, while only nodes 310 and 318 are child nodes of node 308 in tree 306. However, there are also linked nodes, which are any nodes that are connected or linked to a particular node. Using tree 306, node 308 has linked nodes of the source, node 310, and node 318. Tree management of these nodes is preferably done by a centralized tree manager, such as the server 100 shown in FIG. 2.

Moreover, to ensure diverse and bushy (e.g., high fanout) trees, which in turn ensures more balanced trees with each node having fewer ancestors, each peer or client is typically made an interior node (e.g., a "fertile" node) in a few trees and a leaf node (e.g., a "sterile" node) in the remaining trees. In the illustrated example, the root node of the redundancy trees is the source 314 that is providing the stream data. In tree 306, node 310 and node 316 are child nodes of the source 314, while node 310 and node 320 are child nodes in tree 312. Node 308 is a parent node of child node 310 and child node 318 in tree 306, yet is a child node of node 310 in tree 312. Although node 322 remains a child node in both trees 306 and 312, node 322 is likely a parent node in other trees that are not shown.

Because of this arrangement, if node 308 is disconnected, nodes 310 and 318 will no longer receive data in tree 306, but nodes 310 and 318 continue to receive data in tree 312. As a result, redundancy is created in path and data. Because of the diverse distribution of the trees, each client or peer receives the descriptions over a diverse set of paths, making it more likely that each peer will continue to receive the majority of the descriptions even if one or more peers experience failures. It should be noted though that the trees shown in FIG. 4 are conceptual representation of an arrangement of the network through the binary trees, and thus should not be interpreted as a physical description of the peer-to peer network. The present invention can be implemented in various network, such as a Cooperative Networking ("CoopNet") as disclosed in an article entitled, "Distributing Streaming Media Content Using Cooperative Networking," by Padmanabhan, V. N., Wang, H. J., Chou, P. A., and Sripanidkulchai, K., Proc. NOSSDAV, May 2002 and another article entitled, "Resilient Peer-to-Peer Streaming," by Padmanabhan, V. N., Wang, H. J., and Chou, P. A., Proc. IEEE ICNP, November 2003, which are herein incorporated by reference in their entirety for all that they teach without exclusion.

Using a network transmitting data through a layered MDC described above, the embodiments of the invention further provide hybrid parent-driven and child-driven adaptation, wherein parents and children cooperatively determine the optimal response to packet loss by exploiting path diversity to localize the cause of the packet loss. The nodes are adapted to exploit their knowledge of the relative importance of the layered MDC substreams and the structure of the distribution trees to adapt to changing bandwidths as to minimize the impact on the descendant nodes. By controlling congestion while accommodating heterogeneity bandwidth, a robust solution to stream data efficiently is achieved.

Figure 5:
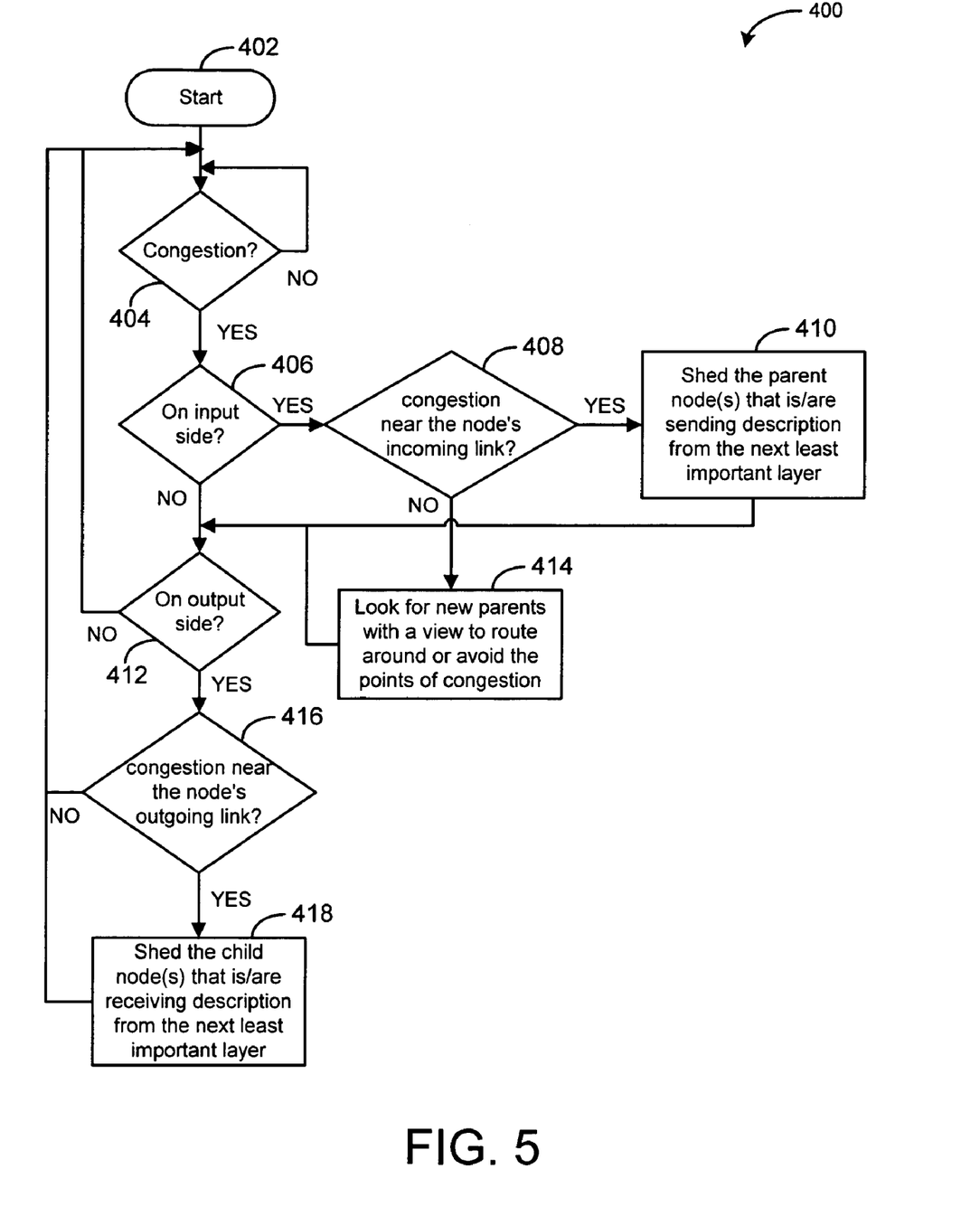
FIG. 5 is a flow chart illustrating steps according to an embodiment of the invention for controlling congestion of a node.

FIG. 5 illustrates a flow chart 400 of steps taken, according to an embodiment of the invention, to control congestion on a node. The node may be a parent node or a child node on multiple trees as shown in FIG. 4, and the data are streamed via multiple prioritized layers as shown in FIGS. 3 and 4. The process starts at step 402. The node determines whether it has any congestion at step 404. If not, the node loops to step 404 to keep checking for congestion. In one embodiment of the invention, congestion on the input side can be detected by the packet loss rate of the incoming stream or streams, whereas congestion on the output side can be detected based on complaints from children experiencing packet loss. Such complaints from children experiencing packet loss need not take the form of explicit complaint messages from child nodes to parent nodes, but can also be the mere absence of expected acknowledgements. Consequently, a node can determine that its children nodes are experiencing packet loss either through the direct actions of the children nodes, such as the sending of messages indicating the packet loss, or through the inactions of the children nodes, such as the failure to send expected acknowledgements. Furthermore, other definitions of congestion are contemplated by the present invention and easily appreciated by one skilled in the art. Moreover, step 404 can be implemented, for example, based on a timeout period. In other words, after a predetermined time has expired, the process can be checked for congestion again, and step 404 is repeated. One skilled in the art would easily appreciate various implementations of step 404, and thus these various implementations are within the scope of the invention.

Once congestion has been detected at step 404, it is determined whether the congestion is on the input side at step 406 by determining whether the node is experiencing high packet loss rates on the incoming streams of data. In one embodiment, a high packet loss rate can be determined by comparing the observed packet loss rate to a threshold rate, such as a historical rate. Packet loss rates that exceed the threshold can be deemed to be high packet loss rates. If the node is experiencing a high packet loss rate, the node next, at step 408, determines whether the congestion is near the node's incoming link. Specifically, in one embodiment, it is determined whether the percentage of the parent node(s) from which the node is receiving streams that have high packet loss rates is greater than a predetermined threshold. When a large fraction (e.g., 50% to 100%) of a node's current parents are sending streams with high packet loss rates, the congestion may be near the node's incoming link. As a result, paths from other potential parent nodes would also likely be congested.

However, this may not always be the case. For instance, consider a child that is unlucky to have several parents with congested uplinks. This may happen in practice because congested links may be concentrated in the "last-mile" to/from peers rather than being spread uniformly throughout the network. To avoid an incorrect determination that the congestion is near the node's incoming link, the node can, as part of step 408, poll its parents for any complaints that the parents may have received from other children, either via explicit messages, or by a lack of expected messages. If the parents are not receiving complaints from other children, or are receiving complaints from a small percentage of children, the node can determine that the congestion is near the node's incoming link. However, if the parents indicate that a lot of other children are also complaining, the node can determine that the congestion is likely near the parents' outgoing links and not near the node's incoming link. In one embodiment, the percentage of children complaining can be compared to a threshold percentage. If a parent node has a percentage of children nodes complaining above the threshold percentage, then it can be determined that the congestion is likely at the parent's outgoing link. In the absence of complaint information from its parents, the child node might have incorrectly concluded that the congestion is at its incoming link and hence proceeded to shed incoming traffic.

Therefore, at step 408, in order to determine whether the congestion is near the node's incoming link the node can initially determine whether a sufficiently large percentage of its parent nodes are sending data streams with high packet loss rates. If a sufficiently large percentages of its parent nodes are sending data streams with high packet loss rates, then the parent nodes can be individually polled to determine whether they have other children with the same packet loss problem (suggesting congestion at the parent nodes' outgoing links) or not (suggesting congestion at the node's incoming link).

Going back to step 408, if the congested node determines that the congestion is near the node's incoming link, by determining that the percentage of parent nodes sending data with high packet loss rates is greater than the threshold and that the parent nodes are not receiving complaints from many other children, the congested node should shed incoming traffic to alleviate the congestion. In such a case, the congested node (e.g., a congested child node) sheds the parent node(s), specifically, in one embodiment, shedding parent node(s) that is/are sending descriptions in a least important layer from among the layers that the node is receiving at step 410. And of such parent nodes, the congested node further preferably sheds those that are sending it descriptions for which it has no children or has few descendant nodes that are using those descriptions. In other words, the parent nodes with the least effect on descendant nodes of the congested node are shed. Such child-driven selective dropping results in better quality than randomly dropping incoming streams. Once the parent nodes are shed at 410, alleviating the congestion of the node, the node next checks for congestion on the output side at 412.

However, if the congestion is determined not to be near the node's incoming link at step 408, such as by determining that the percentage of linked parent nodes sending data with high packet loss rates is not greater than the predetermined threshold, or determining that that the parent nodes are also receiving complains from other children nodes, the node can infer that the congestion is near the parent nodes. In such a case, the congested node looks for new parents with a view to route around or avoid the points of congestion at step 414.

Since congestion on the input side has been addressed by shedding parent nodes at step 410 or step 414, the node next determines whether there is congestion on the output side at step 412. In one embodiment, the congestion on the output side is detected based on complaints from the node's child nodes that are experiencing packet loss. If congestion on the output side is not detected, the node simply loops back to step 404 to check for congestion. Otherwise, if there is congestion on the output side at step 412, the node (e.g., a congested parent node) determines whether the congestion is near its outgoing link at step 416. Again, in one embodiment, the node preferably determines whether the percentage of the linked congested child node(s) is greater than a predetermined threshold. Similar to the input side, when a large fraction (e.g., 50% to 100%) of a node's children are congested, there is the likelihood of congestion being near the node's outgoing link. As a result, an inference can be made that the congestion is near the node's outgoing link. Otherwise, if the congestion is not near the node's outgoing link, the node ignores the congestion of the output side and loops back to step 404 to check for congestion periodically.

In the case when the congestion is near the node's outgoing link, the node sheds outgoing traffic to alleviate the congestion. Specifically, the node sheds its child nodes, which then have to look for new parents. In one embodiment, the node preferably sheds child nodes that are receiving descriptions in a least important layer from among the layers that the node is sending at step 418. And of such children, in another embodiment, it preferably sheds the child nodes that have no or few descendent nodes in the tree. The objective is to pick child nodes that will be least affected by being orphaned because they are receiving least important descriptions from the congested node and have few or no descendants depending upon these child nodes. Such parent-driven selective dropping results in better quality than a policy of randomly dropping packets across all child nodes. Once the congestion on the output side has been addressed, the process loops back to step 404 to periodically check for congestion on the node. A hybrid parent-and-child-driven congestion control scheme that elegantly addresses a key difficulty in using layered coding has been shown. Specifically, the problems of mismatch between the prioritization of the layers and the lack of widespread support for service differentiation are addressed by the present embodiments shown.

Figure 6:
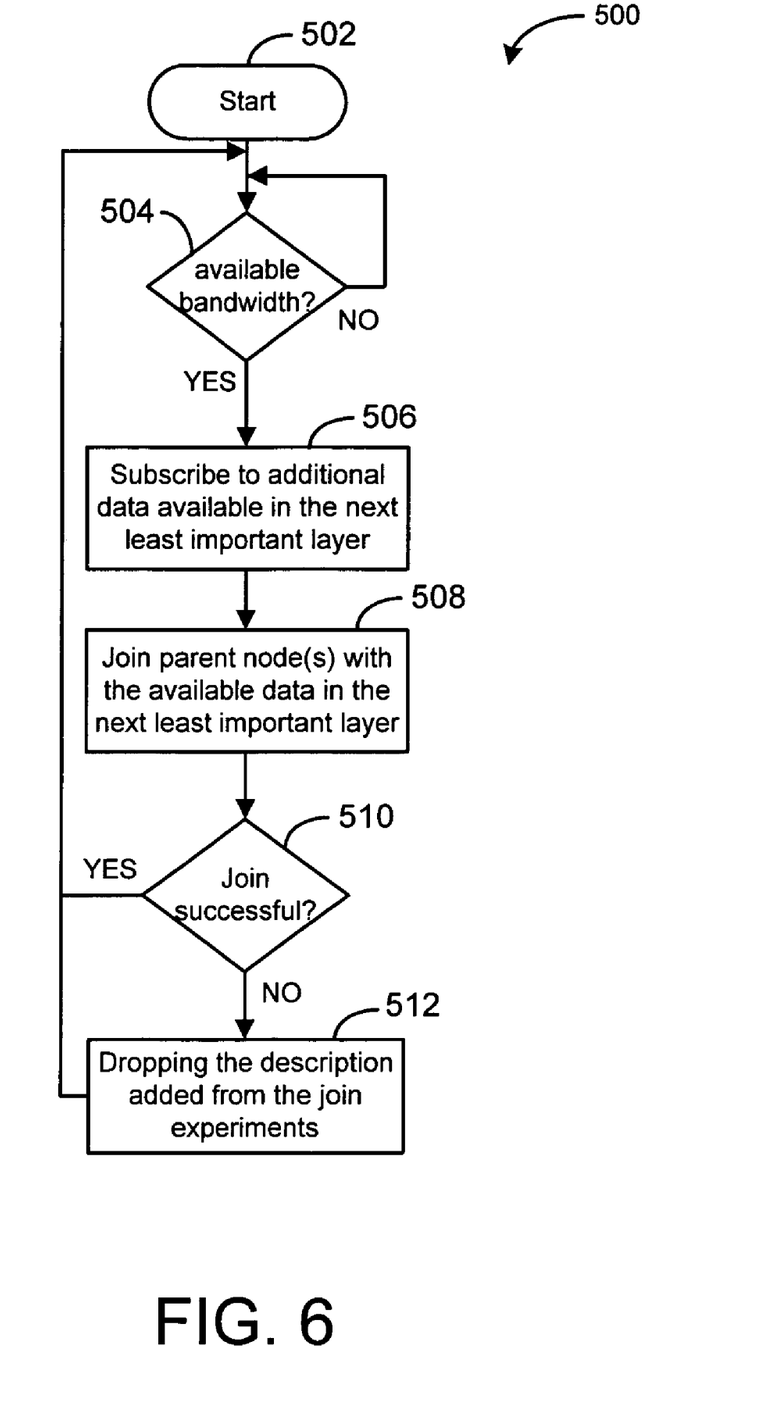
FIG. 6 is a flow chart illustrating steps according to an embodiment of the invention for adding traffic to a node with available bandwidth.

Turning now to FIG. 6, a flow chart of adding traffic is shown and indicated generally at 500. In FIG. 5, a process for a node to adapt to worsening network conditions has been shown. However, a node also needs to probe for newly available bandwidth. The process starts at step 502 and detects the availability of spare bandwidth, if any, at step 504. In other words, the node, at step 504, determines whether it has available bandwidth that is not currently being used. In one embodiment, the availability of spare bandwidth may simply be detected by observing the absence of packet loss for a threshold period of time. If so, the node accordingly subscribes to an additional description in the least important layer from among the layers the node is currently receiving at step 506. Alternatively, if the node is already receiving all of the descriptions in the least important layer from among the layers the node is currently receiving, the node can subscribe to a description in a layer that is less important than the least important layer the node was receiving. The node subscribes to additional descriptions by joining, at step 508, one or more parent nodes sending the available descriptions. In particular, the node carries out a join experiment, by subscribing to an additional description. Subscribing to a new description involves joining the corresponding tree. However, there is always the danger that a join experiment fails because the additional traffic congests a link that was operating almost at capacity. Thus, at step 510, the node next determines whether it joined successfully with the parent node(s). If so, the process ends at step 512. Otherwise, the node drops description that was added during the failed join experiment and loops to step 504 to check for available bandwidth.

Because such an unsuccessful join experiment could lead to packet loss and quality degradation at the receiver node as well as at other nodes (e.g., descendant nodes of the receiver node), the use of layered MDC instead of plain layered coding can minimize the damage because of the layered MDC's inherent redundancy. Using the layered MDC example, it is assumed that subscribing to an additional description causes the loss of at most one description's worth of data (e.g., the additional data can at worst displace an equal amount of data previously subscribed to). If the losses are confined to the same layer as the newly added description, the node is no worse off than before the attempt to join, because all descriptions in a layer are equally valuable. Even if losses are suffered in a more important layer, the redundancy in the layered MDC can typically help recover the affected layer, as shown in FIGS. 3 and 4. In contrast, RLM with plain layered coding is far more susceptible to the deleterious effects of failed join experiments. This is because there is nothing to mask packet loss suffered by a more important layer, which can then render all subsequent layers of received data useless and degrade quality significantly.

The present invention provides a joint design of support for heterogeneity and robustness. Specifically, in one embodiment, an adaptation scheme is provided for heterogeneity in the context of a framework for robustness that incorporates redundancy in network paths and in data using a layered MDC. In another embodiment, a hybrid parent-and-child-driven adaptation is provided that allows the parent and child nodes to cooperatively determine the appropriate response to packet loss by exploiting path diversity to localize the cause of the packet loss. Still in another embodiment, both parent and child nodes exploit their knowledge of the relative importance of the layered MDC substreams and the structure of the distribution trees to adapt to changing bandwidth in a way that minimizes the impact on the descendant nodes. The robustness of join experiments with layered MDC would be advantageous in any RLM-like setting, even one based on a single distribution tree. Inferring the location of congestion could be useful even in an on-demand (non-multicast) streaming scenario where the receiver node requests different substreams from different peers.

Thus, it will be appreciated that an improved system and method for streaming data among multiple computers has been described. In view of the many possible embodiments to which the principles of this invention may be applied, it should be recognized that the embodiments described herein with respect to the drawing figures are meant to be illustrative only and should not be taken as limiting the scope of the invention. For example, those of skill in the art will recognize that some elements of the illustrated embodiments shown in software may be implemented in hardware and vice versa or that the illustrated embodiments can be modified in arrangement and detail without departing from the spirit of the invention. In addition, the illustrated processes may be slightly modified and reordered without departing from the spirit of the invention. Therefore, the invention as described herein contemplates all such embodiments as may come within the scope of the following claims and equivalents thereof.

We claim:

1. A method of controlling congestion among a plurality of nodes divided into a plurality of distribution trees within a computer network, the method comprising:
   assigning a node in the computer network to each of the plurality of distribution trees;
   prioritizing a data stream into a plurality of layers of descriptions from a most important layer to a least important layer;
   distributing the descriptions in the layers across the plurality of distribution trees;
   detecting congestion at the node in the plurality of distribution trees;
   determining whether the congestion is at an incoming link of the node if the congestion is on an input side of the node;
   determining whether the congestion is at an outgoing link of the node if the congestion is on an output side of the node;
   shedding at least one parent node that is sending one or more descriptions in a least important layer among current layers being received by the node if the congestion is at the incoming link of the node; and
   shedding at least one child node that is receiving one or more descriptions in a least important layer among current layers being sent by the node if the congestion is at the outgoing link of the node.

2. The method according to claim 1 wherein the detecting congestion at the node further comprises:
   detecting a packet loss rate of incoming data on the node; and
   determining whether the packet loss rate is greater than a threshold rate.

3. The method according to claim 1 wherein the determining whether the congestion is at the outgoing link of the node further comprises:
   determining whether a percentage of child nodes experiencing congestion on their input sides is greater than a threshold percentage; and
   identifying the congestion as being on the output side when the percentage of child nodes experiencing congestion on their input sides is greater than the threshold percentage.

4. The method according to claim 1 wherein the determining whether the congestion is near at the incoming link of the node comprises:
   determining whether a percentage of parent nodes sending data across a congested path is greater than a threshold percentage; and
   identifying the congestion as at the incoming link of the node when the percentage of parent nodes sending data across the congested path is greater than the threshold percentage.

5. The method according to claim 4 further comprising:
   determining whether one or more other child nodes of the parent nodes sending data across the congested path are experiencing congestion on their input sides; and
   identifying the congestion as not being at the incoming link of the node when the one or more other child nodes of the parent nodes sending data across the congested path are also experiencing congestion on their input sides.

6. The method according to claim 1 wherein the plurality of layers are divided into a base layer as the most important layer, wherein the base layer is optimized for low-bandwidth computers, and at least one enhancement layer as a next least important layer, wherein the at least one enhancement layer is optimized for high-bandwidth computers.

7. The method according to claim 1 wherein there is a plurality of parent nodes sending one or more descriptions in the least important layer among current layers being received by the node, and the parent node that has the least effect on the descendent nodes of the node is disconnected.

8. The method according to claim 1 wherein there is a plurality of child nodes receiving one or more descriptions in the least important layer among current layers being sent by the node, and the child node that has the least number of descendent nodes is disconnected.

9. The method according to claim 1 further comprising: looking for at least one new parent node in order to avoid the congestion when the congestion is on the input side of the node and the congestion is not at the incoming link of the node.

10. The method according to claim 1 further comprising:
    detecting an availability of spare bandwidth to a node; and
    subscribing to an additional description in a least important layer among current layers being received by the node with the spare bandwidth.

11. The method according to claim 10 further comprising: joining at least one parent node transmitting the additional description in the least important layer among current layers being received by the node.

12. A method of controlling congestion among a plurality of nodes divided into a plurality of distribution trees within a computer network, wherein data is prioritized into a plurality of layers of descriptions from a most important layer to a least important layer, the method comprising:
    assigning a node in the computer network to each of the plurality of distribution trees;
    prioritizing a data stream into the plurality of layers of descriptions from the most important layer to the least important layer;
    distributing the descriptions in the layers across the plurality of distribution trees;

detecting congestion at the node in the plurality of distribution trees;

shedding at least one parent node that is sending one or more descriptions in a least important layer among current layers being received by the node if the congestion is at an incoming link of the node; and shedding at least one child node that is receiving one or more descriptions in a least important layer among current layers being sent by the node if the congestion is at an outgoing link of the node.

13. The method according to claim 12 wherein the plurality of layers are divided into a base layer as the most important layer, wherein the base layer is optimized for low-bandwidth computers, and at least one enhancement layer as a next least important layer, wherein the at least one enhancement layer is optimized for high-bandwidth computers.

14. The method according to claim 12 wherein there is a plurality of parent nodes sending one or more descriptions in the least important layer among current layers being received by the node, and the parent node that has the least effect on the descendent nodes of the node is disconnected.

15. The method according to claim 12 wherein there is a plurality of child nodes receiving one or more descriptions in the least important layer among current layers being sent by the node, and the child node that has the least number of descendent nodes is disconnected.

16. A computer-readable medium having thereon computer-executable instructions for controlling congestion among a plurality of nodes divided into a plurality of distribution trees within a computer network, the instructions for performing steps comprising:

assigning a node in the computer network to each of the plurality of distribution trees;

prioritizing a data stream into a plurality of layers of decriptions from a most important layer to a least important layer;

distributing the descriptions in the layers across the plurality of distribution trees;

detecting congestion at the node in the plurality of distribution trees;

determining whether the congestion is at an incoming link of the node if the congestion is on an input side of the node;

determining whether the congestion is at an outgoing link of the node if the congestion is on an output side of the node;

shedding at least one parent node that is sending one or more descriptions in a least important layer among current layers being received by the node if the congestion is at the incoming link of the node; and shedding at least one child node that is receiving one or more descriptions in a least important layer among current layers being sent by the node if the congestion is at the outgoing link of the node.

17. The medium according to claim 16 wherein the computer-executable instructions for detecting congestion at the node further comprise computer-executable instructions for:

detecting a packet loss rate of incoming data on the node; and determining whether the packet loss rate is greater than a threshold rate.

18. The medium according to claim 16 wherein the computer-executable instructions for determining whether the congestion is at the outgoing link of the node further comprise computer-executable instructions for:

determining whether a percentage of child nodes experiencing congestion on their input sides is greater than a threshold percentage; and identifying the congestion as being on the output side when the percentage of child nodes experiencing congestion on their input sides is greater than the threshold percentage.

19. The medium according to claim 16 wherein the computer-executable instructions for determining whether the congestion is at the incoming link of the node further comprise computer-executable instructions for:

determining whether a percentage of parent nodes sending data across a congested path is greater than a threshold percentage; and identifying the congestion as near the incoming link of the node when the percentage of parent nodes sending data across the congested path is greater than the threshold percentage.

20. The medium according to claim 19 further comprising computer-executable instructions for:

determining whether one or more other child nodes of the parent nodes sending data across the congested path are experiencing congestion on their input sides; and identifying the congestion as not being at the incoming link of the node when the one or more other child nodes of the parent nodes sending data across the congested path are also experiencing congestion on their input sides.

21. The medium according to claim 16 wherein the plurality of layers are divided into a base layer as the most important layer, wherein the base layer is optimized for low-bandwidth computers, and at least one enhancement layer as a next least important layer, wherein the at least one enhancement layer is optimized for high-bandwidth computers.

22. The medium according to claim 16 wherein there is a plurality of parent nodes sending one or more descriptions in the least important layer among current layers being received by the node, and the parent node that has the least effect on the descendent nodes of the node is disconnected.

23. The medium according to claim 16 wherein there is a plurality of child nodes receiving one or more descriptions in the least important layer among current layers being sent by the node, and the child node that has the least number of descendent nodes is disconnected.

24. The medium according to claim 16 further comprising computer-executable instructions for: looking for at least one new parent node in order to avoid the congestion when the congestion is on the input side of the node and the congestion is not at the incoming link of the node.

25. The medium according to claim 16 further comprising computer-executable instructions for:

detecting an availability of spare bandwidth to a node; and subscribing to an additional description in a least important layer among current layers being received by the node with the spare bandwidth.

26. The medium according to claim 25 further comprising computer-executable instructions for: joining at least one parent node transmitting the additional description in the least important layer among current layers being received by the node.

27. A computer-readable medium having thereon computer-executable instructions for controlling congestion among a plurality of nodes divided into a plurality of distribution trees within a computer network, wherein data is prioritized into a plurality of layers of descriptions from a most important layer to a least important layer, the instructions for performing steps comprising:

assigning a node in the computer network to each of the plurality of distribution trees;

prioritizing a data stream into a plurality of layers of descriptions from a most important layer to a least important layer;

distributing the descriptions in the layers across the plurality of distribution trees;

detecting congestion at the node in the plurality of distribution trees;

shedding at least one parent node that is sending one or more descriptions in a least important layer among current layers being received by the node if the congestion is at an incoming link of the node; and shedding at least one child node that is receiving one or more descriptions in a least important layer among current layers being sent by the node if the congestion is at an outgoing link of the node.

28. The medium according to claim 27 wherein the plurality of layers are divided into a base layer as the most important layer, wherein the base layer is optimized for low-bandwidth computers, and at least one enhancement layer as a next least important layer, wherein the at least one enhancement layer is optimized for high-bandwidth computers.

29. The medium according to claim 27 wherein there is a plurality of parent nodes sending one or more descriptions in the least important layer among current layers being received by the node, and the parent node that has the least effect on the descendent nodes of the node is disconnected.

30. The medium according to claim 27 wherein there is a plurality of child nodes receiving one or more descriptions in the least important layer among current layers being sent by the node, and the child node that has the least number of descendent nodes is disconnected.

* * * * *

UNITED STATES PATENT AND TRADEMARK OFFICE
CERTIFICATE OF CORRECTION

| | | |
|---|---|---|
| PATENT NO. | : 7,400,577 B2 | Page 1 of 1 |
| APPLICATION NO. | : 10/787612 | |
| DATED | : July 15, 2008 | |
| INVENTOR(S) | : Venkata N. Padmanabhan et al. | |

It is certified that error appears in the above-identified patent and that said Letters Patent is hereby corrected as shown below:

In column 13, line 35, in Claim 16, delete "decriptions" and insert -- descriptions --, therefor.

Signed and Sealed this
Nineteenth Day of April, 2011

David J. Kappos
*Director of the United States Patent and Trademark Office*